United States Patent [19]
Blomgren

[11] 3,984,889

[45] Oct. 12, 1976

[54] LOADING DOCK SUPPORT

[75] Inventor: Steven Blomgren, Monroe, Mich.

[73] Assignee: Monroe Auto Equipment Company, Monroe, Mich.

[22] Filed: Jan. 2, 1976

[21] Appl. No.: 646,072

Related U.S. Application Data

[63] Continuation of Ser. No. 460,689, April 15, 1974, abandoned, which is a continuation of Ser. No. 245,171, April 18, 1972, abandoned.

[52] U.S. Cl. ............................. 14/71.7; 188/317; 188/280
[51] Int. Cl.² ......................................... B65G 11/00
[58] Field of Search ............ 14/71 H, 71 M; 188/88, 188/280, 317, 281, 318, 282; 91/398, 401

[56] References Cited
UNITED STATES PATENTS

| | | | |
|---|---|---|---|
| 2,697,496 | 12/1954 | McIntyre | 188/88 |
| 2,841,813 | 7/1958 | Falk | 188/317 X |
| 2,881,457 | 4/1959 | Rodgers | 14/71 |
| 2,897,923 | 8/1959 | Agar | 188/317 X |
| 3,038,560 | 6/1962 | Long | 188/88 |
| 3,167,796 | 2/1965 | Layne | 14/71 |
| 3,256,961 | 6/1966 | De Carbon | 188/317 |
| 3,271,801 | 9/1966 | Dieter | 14/71 |
| 3,290,709 | 12/1966 | Whitenack | 14/71 |
| 3,694,839 | 10/1972 | Loblick | 14/71 |
| 3,835,497 | 9/1974 | Smith | 14/71 |

*Primary Examiner*—Nile C. Byers, Jr.
*Attorney, Agent, or Firm*—Harness, Dickey & Pierce

[57] ABSTRACT

A weight-sensitive support assembly for an adjustable dock board of the type including a ramp with front and rear edges, with the rear edge being hingedly connected to an associated support structure so that the ramp may be swung up and down between a relatively lowered position and a relatively elevated position, the assembly comprising an elongated hollow cylinder member containing a quantity of operating fluid, a piston reciprocally disposed within the cylinder member, a piston rod member connected to the piston, connecting means operatively connecting one of the members to the ramp and the other of the members to the associated support structure, and valve means for controlling movement of the piston within the cylinder member, the valve means being responsive to a first preselected load applied to the ramp to resist movement of the piston within the cylinder member and being further responsive to a second preselected load applied to the ramp to permit movement of the piston and piston rod relative to the cylinder member, whereby the ramp will be maintained in a predetermined position when the first preselected load is applied thereto, and may be moved toward the other of said positions when the second preselected load is applied thereto.

7 Claims, 4 Drawing Figures

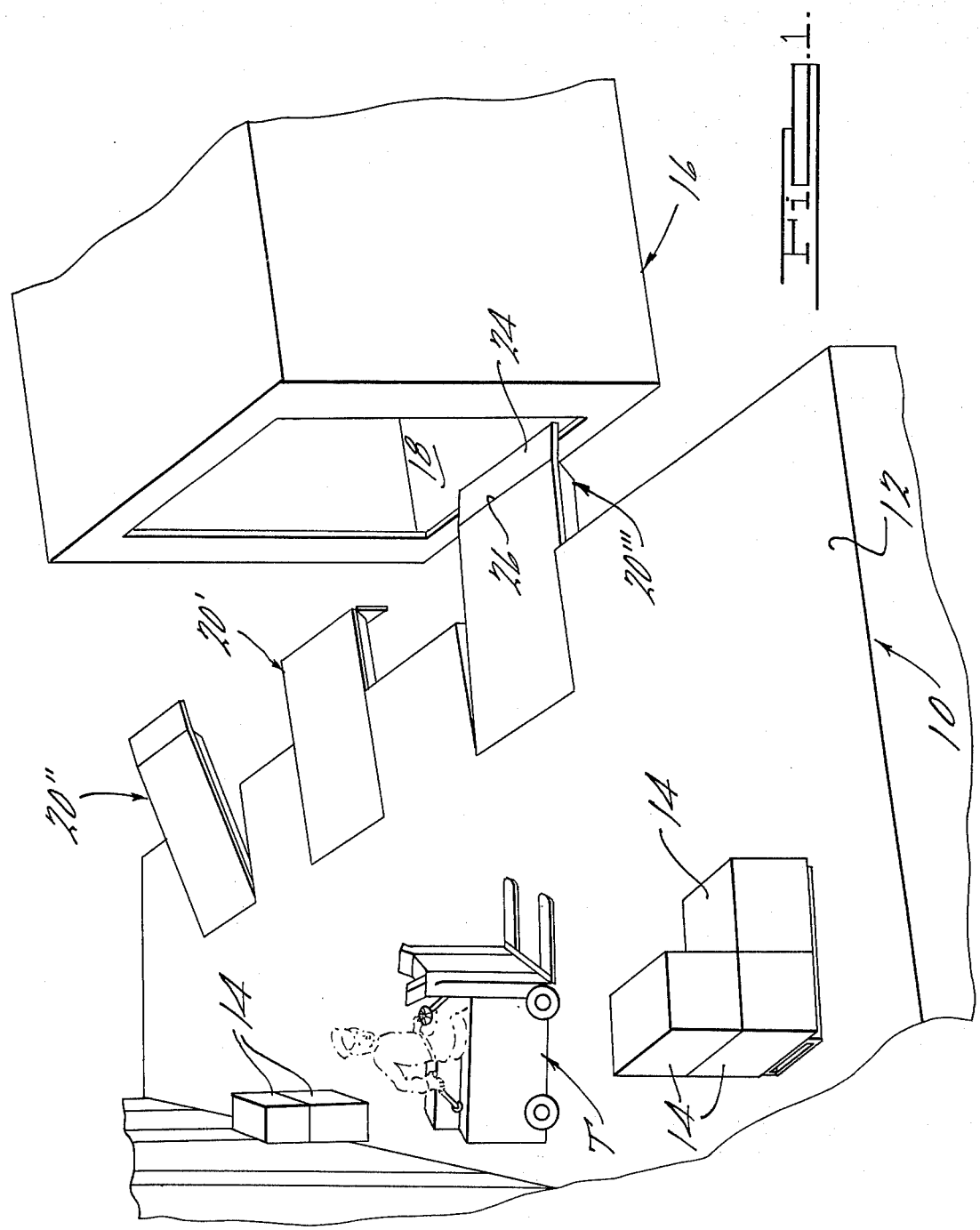

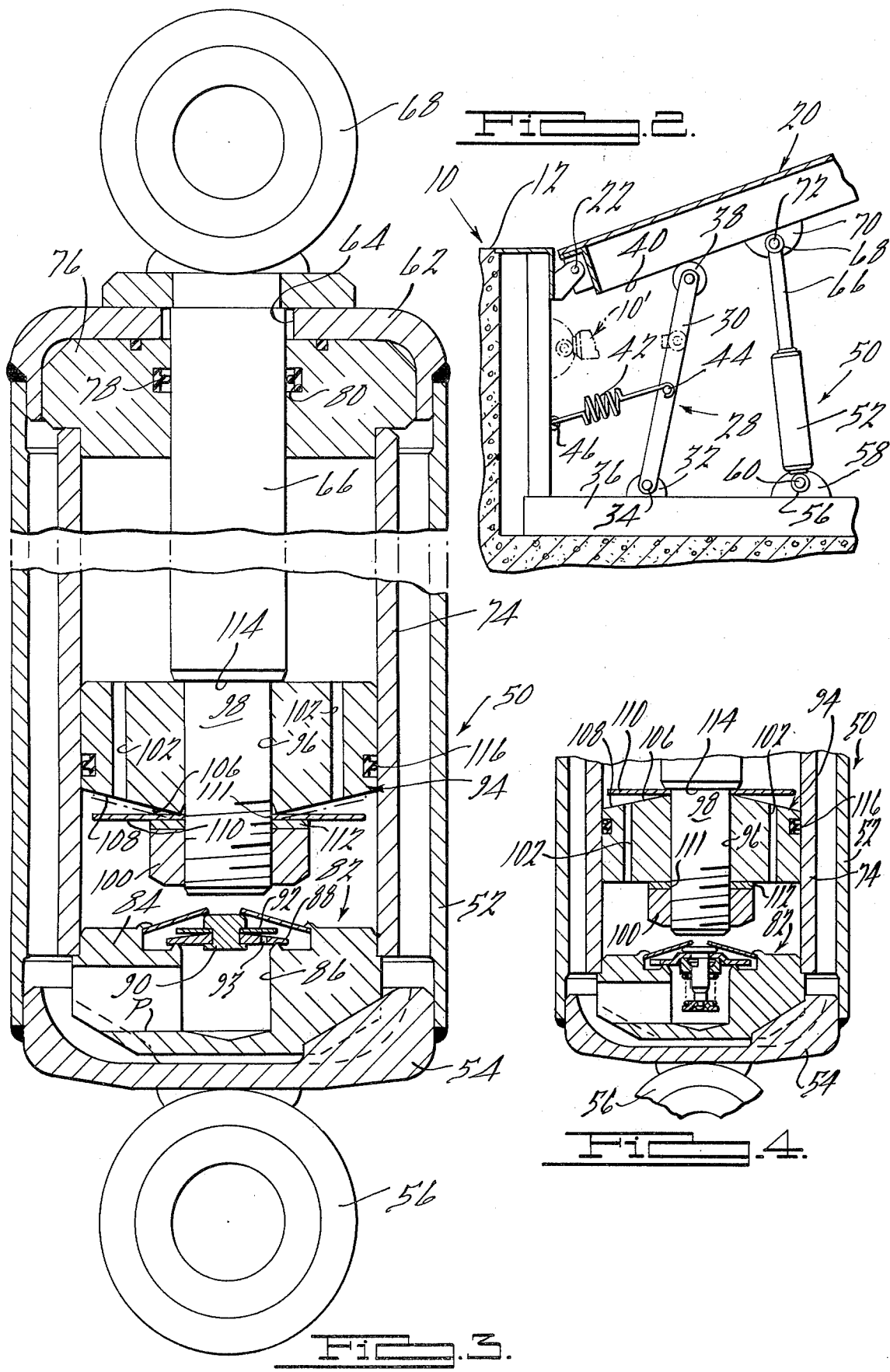

LOADING DOCK SUPPORT

This is a continuation, of application Ser. No. 460,689, filed Apr. 15, 1974, now abandoned which is a continuation of Ser. No. 245,171 filed Apr. 18, 1972, now abandoned.

BACKGROUND OF THE INVENTION

Dock boards in general are installed on loading docks to bridge or span the gap between the dock and the bed of a truck or other carrier, whereby to provide for convenient loading or unloading of the carrier. The conventional dock board includes a ramp which is pivotably mounted at its rear edge to the loading dock, with the front edge of the ramp being located adjacent to the front of the dock and being provided with an extension flange or lip which is hinged to the ramp. Typically, an entire dock board might be mounted within a shallow pit or depression in the dock and when in the storage position, the ramp will be flush with the upper surface of the dock and the lip will hang downwardly in a pendant position.

To operate a conventional dock board, the truck or other carrier to be loaded or unloaded is backed into position in confronting relationship with the dock and a hold-down device, which normally functions to maintain the ramp in a horizontal position, is manually released, therby permitting some type of spring or counter-balancing means to bias the ramp upwardly to a relatively elevated position. At the same time, the extension lip may be extended to a position somewhat short of its fully extended working position. When the ramp is in this position, the operator can walk out onto the ramp and the weight of the operator overcomes the force of the counter-balancing or spring mechanism, with the result that the ramp is biased downwardly under the weight of the operator and the extension lip is moved down onto the carrier bed. Normally, such dock boards are provided with support legs that extend downwardly from the undersides thereof and are adapted for engagement with a suitable support surface for supporting the ramp in a generally horizontal orientation, with such legs serving to support the ramp entirely or to supplement the associated carrier bed in supporting the ramps in the loading configuration.

One potentially serious problem which exists in connection with dock boards resides in the fact that bodily injury and property damage may very likely occur when the carrier prematurely leaves the loading dock, thus leaving the outer or cantilevered end of the ramp unsupported. Such a problem is particularly serious in the event the carrier prematurely moves at such time as relatively heavy equipment, such as a fork-lift truck or other cargo carrying vehicle happened to be traversing the ramp.

While a large variety of various types of devices have been heretofore provided for assuring against possible bodily and property damage in the event of an occurrence such as that described above, the various devices in the prior art have been objectionable from the standpoint that they have been extremely complicated in structure and operation and therefore are subject to malfunction, as well as being extremely expensive to install, maintain and operate. Additionally, many of the devices heretofore known in the prior art have not been failsafe so that in the event of a malfunction of the support mechanism for the ramp, the ramp itself was subject to suddenly dropping downwardly, resulting in injury or damage to any persons or equipment thereon or in the vicinity thereof.

The present invention is directed toward a novel support assembly adapted to be operatively associated with dock boards of the above described type and which is adapted to overcome the many objectionable characteristics of similar type dock board support arrangements heretofore known and used. In particular, the dock board support assembly of the present invention comprises a piston and cylinder arrangement which is cooperative with a supply of hydraulic operating fluid and which includes a novel valve arrangement whereby the ramp may be biased downwardly under the influence of the weight of the operator or some other predetermined magnitude of loading on the ramp; however, in the event the ramp is subjected to some higher magnitude of loading, the degree of which may be controlled by properly designing the aforesaid valve means, the support assembly positively resists further downward movement of the ramp. Moreover, the higher the pressure or degree of loading of the ramp, the more positive the supporting action of the support assembly, with the result that the assembly is failsafe. In addition, the support assembly of the present invention is completely self-contained and thus requires no auxiliary plumbing, valving or hydraulic pumps or the like and thus may be economically manufactured, maintained and will have a long and effective operational life.

SUMMARY OF THE INVENTION

This invention relates generally to dock boards and, more particularly, to a new and improved dock board support assembly.

It is accordingly a general object of the present invention to provide a new and improved dock board support assembly.

It is a more particular object of the present invention to provide a new and improved dock board support assembly which is failsafe in operation and which is completely devoid of any external pumps, plumbing, valving, etc., so as to be entirely self-contained.

It is yet another object of the present invention to provide a new and improved dock board support assembly which is responsive to one magnitude of loading on the associated dock board ramp to permit relatively free movement thereof, but is responsive to a substantially greater weight or degree of loading upon the ramp to positively prevent movement of the ramp.

It is still another object of the present invention to provide a new and improved dock board support assembly which is of a relatively simple design, is economical to manufacture and will have a long and effective operational life.

Other objects and advantages of the present invention will become apparent from the following detailed description taken in conjunction with the accompanying drawing(s).

BRIEF DESCRIPTION OF THE DRAWINGS

FIG. 1 is an elevated perspective view of a typical loading dock having the new and improved dock board support assembly of the present invention in operative association therewith;

FIG. 2 is a transverse cross-sectional view illustrating the dock board support assembly of the present invention in operative association with a typical loading dock and dock board ramp;

FIG. 3 is an enlarged longitudinal cross-sectional view of the dock board support assembly of the present invention, and FIG. 4 is a fragmentary cross-sectional view of a modified embodiment of the dock board support assembly of the present invention.

DETAILED DESCRIPTION OF A PREFERRED EMBODIMENT

Referring now in detail to the drawings and in particular to FIG. 1 thereof, a conventional loading dock 10 is illustrated as comprising elongated, generally horizontally disposed support surface or platform 12 upon which cargo containers 14 are placed or moved along when the same are being transferred between the loading dock 10 and a typical cargo carrier or vehicle 16 having a conventional cargo bed 18. Disposed along or upon the loading dock 10 is one or more ramps, generally designated by the numeral 20, which are adapted to be mounted for pivotal or hinged movement by suitable pivot means 22 (see FIG. 2), whereby ramps 20 are pivotably movable between a relatively lowered position, such as is illustrated by the ramp 20' in FIG. 1, to a relatively elevated position such as illustrated by the ramp 20'' shown in FIG. 1. Typically, the ramps 20 are provided with hingedly mounted extension lips or flanges 24 which are hingedly mounted along the outer marginal edges 26 of the ramps 20 and are adapted to cooperate with the ramps 20 in spanning the gap between the loading dock 10 and the cargo bed 18 of the cargo carrying vehicle from which cargo is to be unloaded by means, for example, of a suitable fork lift truck or the like as is illustrated in FIG. 1 and designated by the letter T. As is well known in the art, loading ramps, such as the ramps 20, are normally disposed in a relatively horizontal position, such as that shown by the ramp 20'. The ramps 20 are generally provided with support legs (not shown) which function to operatively support the ramps in a generally horizontal position. Typically, such support legs extend downwardly from the underside of the ramp and bear upon the ground or other suitable support surface located therebelow, with the support legs serving as either the sole support means for the ramp or, alternatively, serving to supplement the associated cargo bed 18 in supporting the ramp. At such time as it is desired to span the gap between the loading dock 10 and an associated carrier, such as the carrier 16, a suitable release mechanism (not shown) is actuated, whereby an associated spring or counterbalance means, hereinafter to be described, biases the ramp 20 from the position shown by the ramp 20' to the position shown by the ramp 20''. Thereafter, the cargo carrying vehicle is moved into confronting relationship with the raised or elevated ramp and an operator merely walks outwardly along the raised ramp, and under the weight of the operator, the ramp is biased downwardly, for example from a position shown by the ramp 20'' to the position shown by the ramp 20''' where the ramp is resting on its support legs and/or upon the cargo bed 18 of the carrier 16.

Referring now to FIG. 2, an exemplary spring means for biasing the ramps 20 upwardly to the position shown by the ramp 20'' is generally designated by the numeral 28 and is shown as comprising an elongated linkage member 30 which is pivotably connected to a suitable connecting bracket 32 by means of a pivot pin or the like 34, the bracket 32 being positively secured to an associated support structure 36 of a loading dock 10. The upper end of the linkage member 30 is disposed adjacent the ramp 20 and is provided, for example, with a suitable roller or the like 38 which is rotatably mounted upon the upper end of the linkage 30 and is adapted to rollingly or slidingly engage an undersurface portion 40 of the ramp 20. A suitable spring element, generally designated by the numeral 42, is disposed interjacent the linkage member 30 and the support structure 36, the spring element 42 being connected at 44 to an intermediate section of the linkage member 30 and at 46 to a suitable fixedly mounted section of the support structure 36. The spring element 42 is designed to exert a biasing force upon the linkage member 30 in a counterclockwise direction about the pivot pin 34, whereby the ramp 20 will be biased upwardly in a counterclockwise direction about the axis defined by the pivotal connection 22. It will be appreciated, of course, that the ramp 20 may be provided with various alternative types of means for biasing the same toward an elevated position, such as various types of counterbalance means and the like known in the prior art, and it is to be understood that the present invention is in no way limited to the specific spring means shown by way of example herein.

In accordance with the principles of the present invention, each of the ramps 20 on the loading dock 10 is provided with a ramp or dock board support assembly, best illustrated in FIGS. 2–4 and generally designated by the numeral 50. Each support assembly 50 comprises an elongated tubular or cylindrical reserve tube 52, the lower end of which is closed by a suitable closure member or end cap 54 that is secured by welding to the lower end of the tube 52. A suitable mounting ring or loop 56 is fixedly attached to the end cap 54 and is adapted to be secured by means of a suitable mounting bracket or the like 58 and a pivot 60 to the support structure 36. The upper end of the reserve tube 52 is closed by means of an upper end cap 62 which is formed with a central aperture or bore 64 through which the upper end of an elongated cylindrical piston rod 66 extends. The upper end of the piston rod 66 is provided with a suitable loop or ring 68 which is adapted to be attached to a connecting bracket 70 and a journal or pivot pin 72 to the underside or surface 40 of the associated ramp 20. It will be noted that while the opposite ends of the assembly 50 are shown as being directly pivotably connected to the support structure 36 and associated ramp 20, various alternate mounting arrangements are intended to come within the scope of the present invention, for example, one or both of the ends of the support assembly 50 could be secured by suitable linkages or other various connecting arrangements, depending upon the specific geometry and operational environment in which the ramp 20 is located and relative location of the support structure 36.

Each of the support assemblies 50 comprises an inner tubular member or pressure cylinder 74. The pressure cylinder 74 is concentrically disposed with respect to the associated reserve tube 52 and has its upper end closed by an apertured rod guide 76 which is provided with an annular seal 78 located within a circumferentially extending recess 80 and adapted to sealingly engage the outer periphery of the piston rod 66. It will be appreciated, of course, that the pressure cylinder 74 and reserve tube 52 or at least a portion thereof defined between the inner periphery of the tube 52 and the outer periphery of the cylinder 74 are filled with a suitable operating fluid, preferably in the form of a conventional hydraulic liquid.

The lower end of the pressure cylinder 74 is closed by means of a base valve assembly, generally designated by the numeral 82. The assembly 82 comprises an annular valve body 84 which is provided with suitable grooves which communicate the space beneath the valve body 84 with the reserve tube 52. The valve body 84 is formed with a central aperture 86, the upper end of which is adapted to be selectively closed by means of a valve disc 88 into which a valve pin 90 extends. A spring-like valve element 92 is provided directly above the disc 88 and is adapted to be selectively moved into engagement with the upper surface of the disc 88 to close one or more flow ports 93 that extend axially through the disc 88. Normally, the valve element 92 is spaced away from the disc 88 and thereby provides for fluid flow downwardly through the ports 93; however, at such time as the assembly 50 undergoes a compression stroke, the valve element 92 will move downwardly to close the upper ends of the ports 93 and prevent fluid from flowing into the fluid reservoir defined by the pressure cylinder 74 and reserve tube 52. It will be noted that the valve body 84 is provided with a generally radially disposed fluid passage P which communicates the aforementioned reservoir with the bore 86, with the passage P preferably being oriented perpendicular to the axis of the assembly 10 in order to permit the assembly 10 to be mounted horizontally, as opposed to generally vertically, as indicated by the assembly 10' shown in FIG. 2.

Disposed adjacent the lower end of the piston rod 66 is a longitudinally reciprocable piston member 94 which is of a generally cylindrical configuration and is adapted to slide upwardly and downwardly with the piston rod 66 interiorly of the pressure cylinder 74. The piston member 94 is formed with a central annular bore 96 which is adapted to receive a reduced diameter end section 98 formed at the lower end of the piston rod 66. A suitable retaining nut or the like 100 is threadably received on the end section 98 and adapted to secure the piston member 94 to the piston rod 66. The piston member 94 is formed with a plurality of axially extending, circumferentially spaced bores or ports 102 through which fluid is adapted to flow as the piston member 94 moves upwardly and downwardly within the pressure cylinder 74. The number of ports or bores 102 may be carefully calibrated or calculated to give the desired operational characteristics of the assembly 50, as will hereinafter be described.

The lower end of the piston member 94 is formed with an upwardly and radially outwardly tapered lower surface 106 which defines a plurality of valve seat areas, generally designated by the numeral 108 and located one adjacent each of the bores 102. Disposed directly below the tapered surface 106 is an annular valve disc 110 which is arranged concentrically or coaxially of the piston member 94 and is slightly smaller in diameter than the inner diameter of the pressure cylinder 74. The valve disc 110 is preferably fabricated of spring steel or a similar relatively resilient material. The valve disc 110 is formed with an annular bore 111 through which the section 98 of the piston rod 96 extends, the disc 110 being retained between the surface 106 and torque washer 112 which are forced upwardly by the nut 100 to a position wherein the piston member 94 is engaged with an annular shoulder 114 formed at the upper end of the piston rod section 98. As is conventional, the outer periphery of the piston member 94 is provided with a peripheral seal 116 adapted to sealingly engage the inner periphery of the pressure cylinder 74 to prevent fluid from bypassing the flow ports 102. The bore or ports 102, along with the ports 93, valve element 92 and valve disc 110 are balanced or calibrated so that the respective ports will be simultaneously closed in response to a pre-determined axially directed force exerted against the piston rod 66, as will be appreciated by those skilled in the art.

In operation of the dock board support assembly of the present invention, as previously mentioned, the ramps 20 (see FIG. 1) are normally disposed in a relatively horizontal orientation, such as depicted by the ramp 20', and are maintained in this position by a suitable release mechanism (not shown). At such time as it is desired to effect the loading or unloading of a vehicle or carrier, the aforesaid release mechanism is actuated, whereby the spring means, herein generally designated by the numeral 28, effects upward pivotal movement of the ramps 20, for example, from a position shown by the ramp 20' to the position shown by the ramp 20''. As the ramp 20 is thus pivoted to its elevated position, the associated support assembly 50 will be expanded or telescoped, whereby the piston rod 66 and piston 94 will move upwardly relative to the pressure cylinder 74. By virtue of the fact that the outer periphery of the spring disc 110 is normally spaced axially away from the lower ends of the bores 102, fluid within the pressure cylinder 74 may freely flow downwardly through the bores 102 to the lower end thereof as the piston rod 66 and piston member 94 move upwardly within the cylinder 74.

After the ramp 20 has been biased to its elevated position, a vehicle or other carrier may be moved into confronting relationship thereto, as is illustrated in FIG. 1. At this time an operator may walk outwardly upon the elevated ramp, whereby the ramp will, under the weight or load applied thereto solely by the operator, be biased downwardly to a position wherein the flange 24 is resting upon the cargo bed 18 of the associated carrier. Such downward movement of the platform 20 is permitted by virtue of the fact that the valve disc 110 is spaced downwardly or away from the valve seat sections 108 of the surface 106, whereby the piston rod 66 and piston 94 may move downwardly within the pressure cylinder 74. The size and number of bores 102 and the particular spring characteristics of the disc 110 are designed such that the disc 110 will remain spaced away or disengaged from the surface sections 108 when a load of a first predetermined magnitude, preferably equal to the approximate weight of a person, is placed upon the ramp 20, with the result that when a person walks outwardly upon the ramp 20, the same will move downwardly against the resistance of the spring means 28 and thereby effect collapsing of the assembly 50; however, at such time as a weight or load in excess of the aforesaid predetermined amount is applied to the ramp 20, as might occur when one of the associated support legs collapse or for some reason the outer end of the ramp 20 is not supported upon the associated cargo bed 18, the fluid below the piston 94 will cause the valve disc 110 to be biased into engagement with the valve seat sections 108, thereby blocking fluid flow through the bores 102 so as to prevent downward movement of the piston 94 and the piston rod 66 within the assembly 50. Simultaneously the fluid pressure within the pressure cylinder 74 will cause the valve element 92 to move downwardly into engagement with the upper surface of the valve disc 88 to block fluid flow through the ports 93. Thus, when any weight or load in excess of the aforesaid predetermined magnitude is applied to the ramp 20, the ramp 20 will remain stationary, i.e., will not be biased downwardly, and at such time as the excessive load is removed from the ramp 20, the same may be effortlessly lowered merely by the application of the weight of the person or the operator standing thereon.

From the foregoing, it will be seen that the present invention provides a dock board support assembly which will be extremely reliable, durable, and will have little or no resistance to movement under relatively lightly loaded conditions, i.e., when the associated ramp or dock board is subjected to the weight of the operator standing thereon. Under high-load conditions, for example, when a quantity of cargo is being transferred across the dock board by a fork lift truck or the like, the ramp will be supported by the associated support legs and or cargo bed; however, in a panic or emergency situation wherein the legs collapse or the associated carrier prematurely moves away from the outer end of the dock board the support assembly 10 will operate to positively maintain or support the ramp in its generally horizontal position to assure against personal injury and equipment damage. The support assembly will be seen to be failsafe by virtue of the fact that the greater the load applied to the associated ramp, the higher the pressure within the lower end of the pressure cylinder 74 and thus the more positively the valve disc 110 will be engaged with the underside of the piston 94 to effect closing of the bores 102. A particular feature of the present invention will be seen from the fact that no external pumps, plumbing, or valving is required and that the assembly 50 is therefore completely self-contained. In addition, due to the provision of the base valve 82 and the associated reserve tube 52, the assembly will always be maintained in a primed condition.

It may be noted that a typical ramp may be provided with one or more of the assemblies 50, depending upon the particular size and design thereof. Additionally, it will be seen that the present invention is not intended to be limited to a construction wherein the valve disc 110 is located adjacent the lower end of the piston 94, since for different types of applications, the disc 110 could be located adjacent the upper end thereof so that the bores 102 would be closed when the assembly is subjected to excessive loading which would operate upon the assembly 50 to telescope or effect extention thereof. Toward this end, references will be made to FIG. 2 wherein the assembly 10' is adapted to resist outward movement of the member 30 in a panic or emergency situation. In such an application, the valve disc 110 would be mounted on the upper side of the piston 94, as seen in FIG. 4, and adapted to move into engagement with a tapered valve seat 108 when the assembly 50 is subjected to a pre-determined tension force, as might occur when the associated support legs collapse. It will be appreciated, of course, that when the assembly 10' is adapted to assure against relative longitudinal movement by the piston rod 66 away from the reserve tube 52 and pressure cylinder 74, the associated base valve 82 would have to be modified to work in the opposite direction of the valve 82 shown in FIG. 3. Generally speaking, a valve construction shown in FIG. 4 and disclosed in detail in U.S. Pat. No. 2,616,711, would be satisfactory for the subject valve. It will also be appreciated that the particular loading to which the assemblies 50 may be subjected to can be carefully controlled by the number and size of bores 102 and spring characteristics of the disc 110, with the result that the assemblies 50 may be designed to maintain the associated ramp in a preselected attitude at a relative light load, for example, in the order of 200 to 300 pounds, or only under substantially greater loads, in the magnitude of from 1000 to 2000 pounds, depending upon the application of the ramp.

While it will be apparent that the preferred embodiment illustrated herein is well calculated to fulfill the objects above stated, it will be appreciated that the present invention is susceptible to modification, variation and change without departing from the scope of the invention.

I claim:

1. In an adjustable dock board of the type including a ramp with front and rear edges, with the rear edge hingedly connected to an associated support structure so that the ramp may swing up and down between a relatively lowered position and a relatively elevated position, the improvement which comprises, a fluid operated support assembly for operatively supporting said ramp, said assembly comprising a cylinder member containing a quantity of operating fluid, a piston reciprocably disposed within said cylinder member and having a valve face on one side thereof, a piston rod member connected to said piston, means operatively securing one of said members to said ramp and the other of said members to said support structure, fluid passage means in said piston and terminating at one end thereof at said valve face and through which fluid may flow to control longitudinal movement of said piston within said cylinder and a flexible valve disc disposed adjacent said valve face for controlling fluid flow through said passage means, said valve face being defined by a first imaginary plane and the portion of said valve disc adjacent said passage means being defined by a second imaginary plane arranged at a preselected angle to said first imaginary plane, said valve disc being movable between a first position lying along said second plane permitting fluid flow through said passage means and a second position lying along said first plane preventing fluid flow through said passage means, said valve element normally disposed in said first position when said ramp is substantially unloaded and when a load less than a load of predetermined magnitude is applied to said ramp so that fluid may flow through said passage means, with said valve element being movable toward said second position when a load substantially equal to or in excess of said predetermined magnitude is applied to said ramp so as to prevent fluid flow through said passage means, whereby said ramp may be moved between said relatively lowered and elevated positions when said ramp is unloaded or when a load applied to said ramp is of a magnitude less than said predetermined magnitude, but said ramp will remain substantially unmoved toward either said lowered or elevated positions when a load in excess of said predetermined magnitude is applied to said ramp.

2. The invention as set forth in claim 1 which includes spring means normally biasing said ramp towards said elevated position.

3. The invention as set forth in claim 1 wherein said piston is formed with a plurality of axially extending flow ports, wherein said valve disc extends diametrically of said piston adjacent said valve face, and wherein one of said imaginary planes extends perpendicular to the axis of said piston rod.

4. The invention as set forth in claim 3 wherein said second imaginary plane extends perpendicular to the axis of said piston rod and wherein said first plane is arranged at an angle to said first plane such that said valve face is tapered.

5. The invention as set forth in claim 4 which includes spring means normally biasing said ramp toward said relatively elevated position.

6. The invention as set forth in claim 4 wherein said support assembly comprises a reserve tube concentrically surrounding said cylinder member in spaced relationship thereto.

7. The invention as set forth in claim 6 which includes second valve means communicating fluid between interior of said cylinder and said reserve tube.

* * * * *

UNITED STATES PATENT AND TRADEMARK OFFICE
CERTIFICATE OF CORRECTION

PATENT NO. : 3,984,889
DATED : October 12, 1976
INVENTOR(S) : Steven M. Blomgren It is certified that error appears in the above-identified patent and that said Letters Patent are hereby corrected as shown below:

Column 1, line 28, "therby" should be --thereby--.

Column 10, line 1, "first" should be --second--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*